United States Patent
Parker (10) Patent No.: US 7,792,262 B2
(45) Date of Patent: Sep. 7, 2010

(54) METHOD AND SYSTEM FOR ASSOCIATING A CONFERENCE PARTICIPANT WITH A TELEPHONE CALL

(75) Inventor: Cameron J. Parker, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1170 days.

(21) Appl. No.: 11/120,648

(22) Filed: May 2, 2005

(65) Prior Publication Data

US 2006/0245566 A1     Nov. 2, 2006

(51) Int. Cl.
*G06F 15/16* (2006.01)
*H04M 3/42* (2006.01)

(52) U.S. Cl. .......................... 379/202.01; 379/203.01; 379/204.01; 379/205.01; 379/206.01; 709/204; 709/205

(58) Field of Classification Search ............ 379/202.01, 379/203.01, 204.01, 205.01, 206.01; 709/205, 709/204

See application file for complete search history.

(56) References Cited

U.S. PATENT DOCUMENTS 6,628,767 B1 * 9/2003 Wellner et al. ......... 379/202.01
6,754,322 B1 * 6/2004 Bushnell ................. 379/202.01
6,853,716 B1   2/2005 Shaffer et al.
2003/0158900 A1   8/2003 Santos
2006/0149815 A1 * 7/2006 Spradling et al. ........... 709/205

OTHER PUBLICATIONS

International Search Report, International Application No. PCT/US2006/012554, Applicant: Microsoft Corporation, Mailing Date: Mar. 20, 2008.
Supplementary European Search Report, Application No. 06740513.4-1237, Applicant: Microsoft Corporation, Mailing Date: Jul. 14, 2009.

* cited by examiner

*Primary Examiner*—Thjuan K Addy
(74) *Attorney, Agent, or Firm*—Perkins Coie LLP (57) ABSTRACT

A method and system for identifying conference participants who dial in to a telephone conference of an electronic conference that includes a web conference is provided. To identify a conference participant, a conference system displays to a user the names of those conference participants who have not yet been associated with a telephone line of the telephone conference. The conference system plays to the user the identification announcement of a conference participant who is not yet associated with a telephone line. When the user hears the identification announcement, the user recognizes the name of the conference participant and selects the name of that conference participant from the displayed names. The conference system can then associate that conference participant with the telephone line associated with the identification announcement that was played to the user.

15 Claims, 8 Drawing Sheets

METHOD AND SYSTEM FOR ASSOCIATING A CONFERENCE PARTICIPANT WITH A TELEPHONE CALL

TECHNICAL FIELD

The described technology relates generally to web conference systems and particularly to web conference systems that interface with telephone conference systems.

BACKGROUND

Electronic conferences typically comprise a web conference and a telephone conference. The web conference is typically provided by a web conference system, and the telephone portion is typically provided by a telephone conference system. Web conference systems allow conference participants to conduct distributed conferences that may include document, presentation, text, audio (e.g., a sound clip), and video content. Telephone conference systems allow conference participants to participate in a telephone conference that may or may not be part of an electronic conference. To create an electronic conference, a conference organizer uses the web conference system to schedule a web conference, send out invitations to conference participants, and provide the content of the conference. The conference organizer schedules the web conference by identifying the conference participants, such as a conference leader, conference presenters, and conference attendees, and setting the conference time. The conference organizer schedules the telephone conference using the telephone conference system or uses a reservationless telephone conference that does not require scheduling and is always available. The telephone conference system may provide the conference organizer with a telephone leader pass code and a telephone attendee pass code. The invitations that are sent to the conference participants may include the appropriate pass code.

At the scheduled time, the conference participants can use their computer systems to join the web conference by logging on to the web conference system. The web conference system maintains a web roster of the conference participants. If the web conference system has or is provided with the telephone number through which a conference participant is accessible, the web conference system can direct the telephone conference system to place a telephone call to that telephone number so that the conference participant can participate in the telephone conference without having to dial in. The telephone conference system can then notify the web conference system of the telephone line associated with the conference participant. The web conference system can then maintain a mapping of the conference participants to their telephone lines. When a conference participant speaks during the telephone conference, the telephone conference system can notify the web conference system of the telephone line of the speaker. The web conference system uses its mapping to determine the identity of the speaker and identify the speaker to the other conference participants. Also, when a leader or a presenter wants to mute the line of a participant, the web conference system uses the mapping to identify the telephone line to mute.

In some instances, however, conference participants may elect to dial in to the telephone conference, rather than have the web conference system direct the telephone conference system to place a call to the conference participant's telephone. This may occur, for example, when a conference participant is traveling and may not know in advance the telephone number of an accessible telephone. When conference participants join a web conference and join the telephone conference by dialing in to the telephone conference system, the web conference system will not know which of these conference participants are associated with which telephone lines. Thus, when one of those conference participants starts to speak, the web conference system cannot identify the speaker to the other conference participants. In other instances, conference participants may not be able to join the web conference (e.g., because the Internet is not readily accessible), but may decide to join the telephone conference only by dialing in to the telephone conference system. In such an instance, the web conference system will not even have that conference participant in its web roster. Thus, when that conference participant is speaking, the web telephone conference system will not be able to identify that conference participant to the other conference participants other than anonymously (e.g, as "caller 5").

Figure 1:
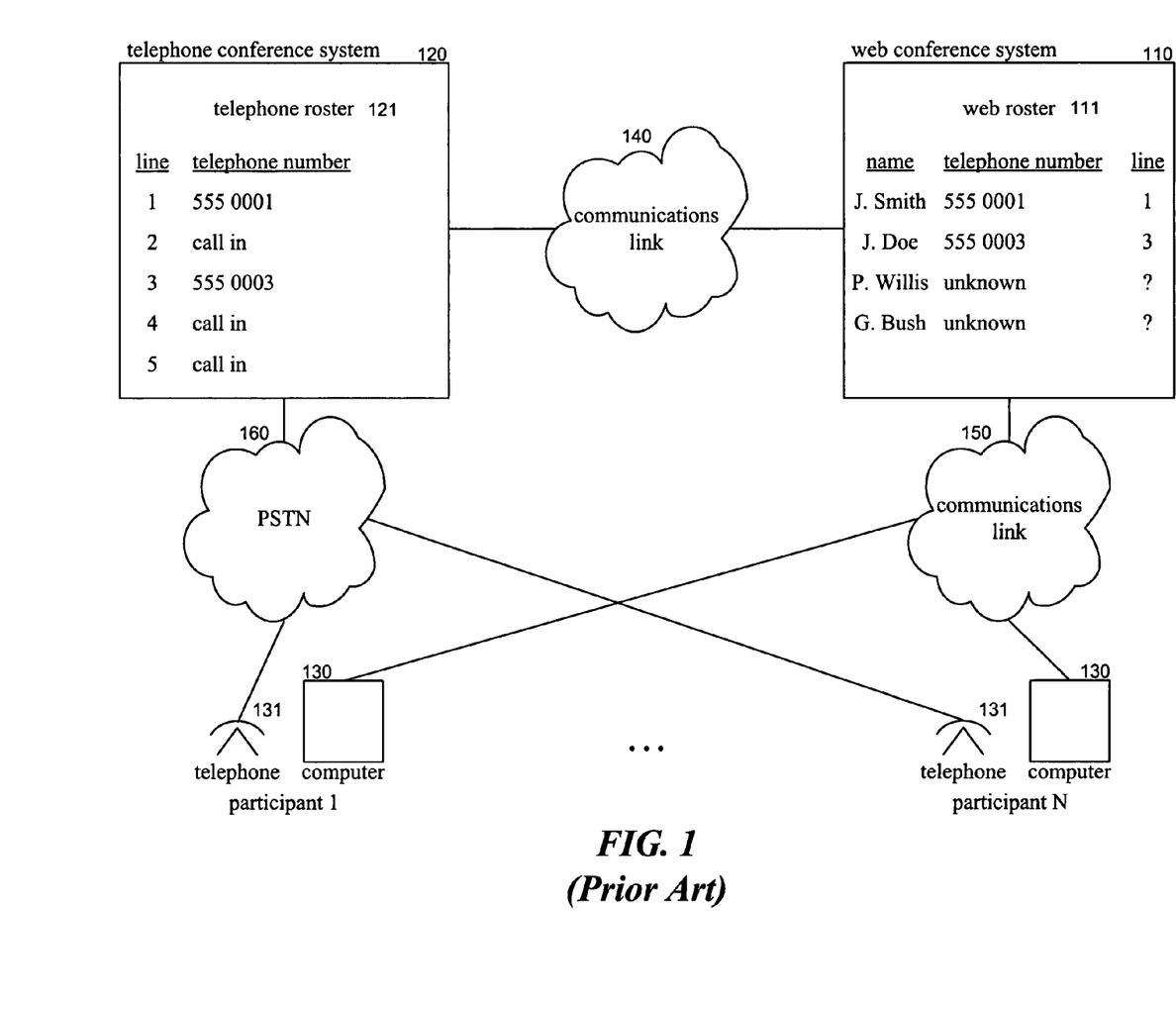
FIG. 1 is a block diagram that illustrates the architecture of a system that supports electronic conferences that include a web conference and a telephone conference.

FIG. 1 is a block diagram that illustrates the architecture of a system that supports electronic conferences that include a web conference and a telephone conference. A web conference system 110 is connected to computers 130 of the conference participants via a communications link 150. A telephone conference system 120 is connected to telephones 131 of the conference participants via a telephone network 160. The web conference system and the telephone conference system are connected via a communications link 140. The web conference system maintains a web roster 111 that maps the name of the conference participant to the telephone number of that conference participant and the identification of the telephone line through which the conference participant is participating in the telephone conference. The telephone conference system maintains a telephone roster 121 that maps the telephone lines of the telephone conference to their telephone numbers. When the telephone conference system places a call to a conference participant, it maps the line to the telephone number of that conference participant. For example, line 1 is mapped to telephone number 555-0001. If, however, a conference participant dials in, the telephone conference system does not map that line to a telephone number. When the web conference system directs the telephone conference system calls a conference participant, the telephone conference system notifies the web conference system after the call is placed so that the web conference system can update its web roster. For example, the conference participant J. Smith has been associated with line 1 of the telephone conference.

It would be desirable to have a mechanism in which a web conference system could identify conference participants who dial in to a telephone conference.

SUMMARY

A method and system for identifying conference participants who dial in to a telephone conference of an electronic conference that includes a web conference is provided. A conference system is implemented on a web conference system that interfaces with a telephone conference system to provide a web portion and a telephone portion of a conference. To identify a conference participant, the web conference system displays to a user (e.g., conference leader) the names of those conference participants who have not yet been associated with a telephone line of the telephone conference. The web conference system also directs the telephone conference system to play to the user the identification announcement of a conference participant who is not yet associated with a telephone line. When the user hears the identification announcement, the user recognizes the name of the conference participant and selects the name of that conference participant from the displayed names. The web conference system can then associate that conference participant with the telephone line associated with the identification announcement that was played to the user.

DETAILED DESCRIPTION

A method and system for identifying conference participants who dial in to a telephone conference of an electronic conference that includes a web conference is provided. In one embodiment, the conference system is implemented on a web conference system that interfaces with a telephone conference system to provide a web portion and a telephone portion of a conference. The web conference system maintains a web roster of conference participants. The telephone conference system maintains a mapping of telephone lines of a telephone conference to identification announcements of the conference participants. An identification announcement is provided by a telephone conference participant to the telephone conference system for use in identifying that conference participant to other telephone conference participants. To identify a conference participant, the web conference system displays to a user (e.g., conference leader) the names of those conference participants who have not yet been associated with a telephone line of the telephone conference. The web conference system also directs the telephone conference system to play to the user the identification announcement of a conference participant who is not yet associated with a telephone line. When the user hears the identification announcement, the user recognizes the name of the conference participant and selects the name of that conference participant from the displayed names. The web conference system can then associate that conference participant with the telephone line associated with the identification announcement that was played to the user. In addition, when a conference participant is participating in only the telephone conference and not the web conference, the user may enter the name of that conference participant as a telephone-conference-only participant into the web roster. Thus, the web conference system will be able to identify conference participants who participate only in the telephone conference. In this way, the web conference system can associate telephone lines with each conference participant of the telephone conference.

In one embodiment, the web conference system may identify a participant in the telephone conference by providing a unique pass code to the participant. When the web conference system has not associated a conference participant who has joined the web conference with a telephone line, the web conference system may generate a unique pass code, provide that pass code to the conference participant (e.g., via a web page or dialog box), and request that the conference participant enter that pass code via their telephone. When the telephone conference system receives the pass code, it forwards it to the web conference system along with the identification of the telephone line through which the pass code was received. The web conference system can then use that pass code to associate the conference participant with that telephone line.

In one embodiment, the web conference system can identify the leader of the telephone conference. A web conference system does not typically know who is the leader of the telephone conference. Thus, the web conference system does not know which conference participant is allowed to control the telephone conference via the web conference system. To identify the leader of the telephone conference, when a conference participant attempts to execute a telephone command via the web conference system, the web conference system prompts the conference participant to enter the leader pass code for the telephone conference. The web conference system also receives the leader pass code from the telephone conference system, or the pass code can be provided by the conference organizer when the meeting was scheduled. If the entered pass code matches the leader pass code, the web conference system identifies that conference participant as the leader of the telephone conference. The web conference system then allows that conference participant to perform the leader commands of the telephone conference.

Figure 2:
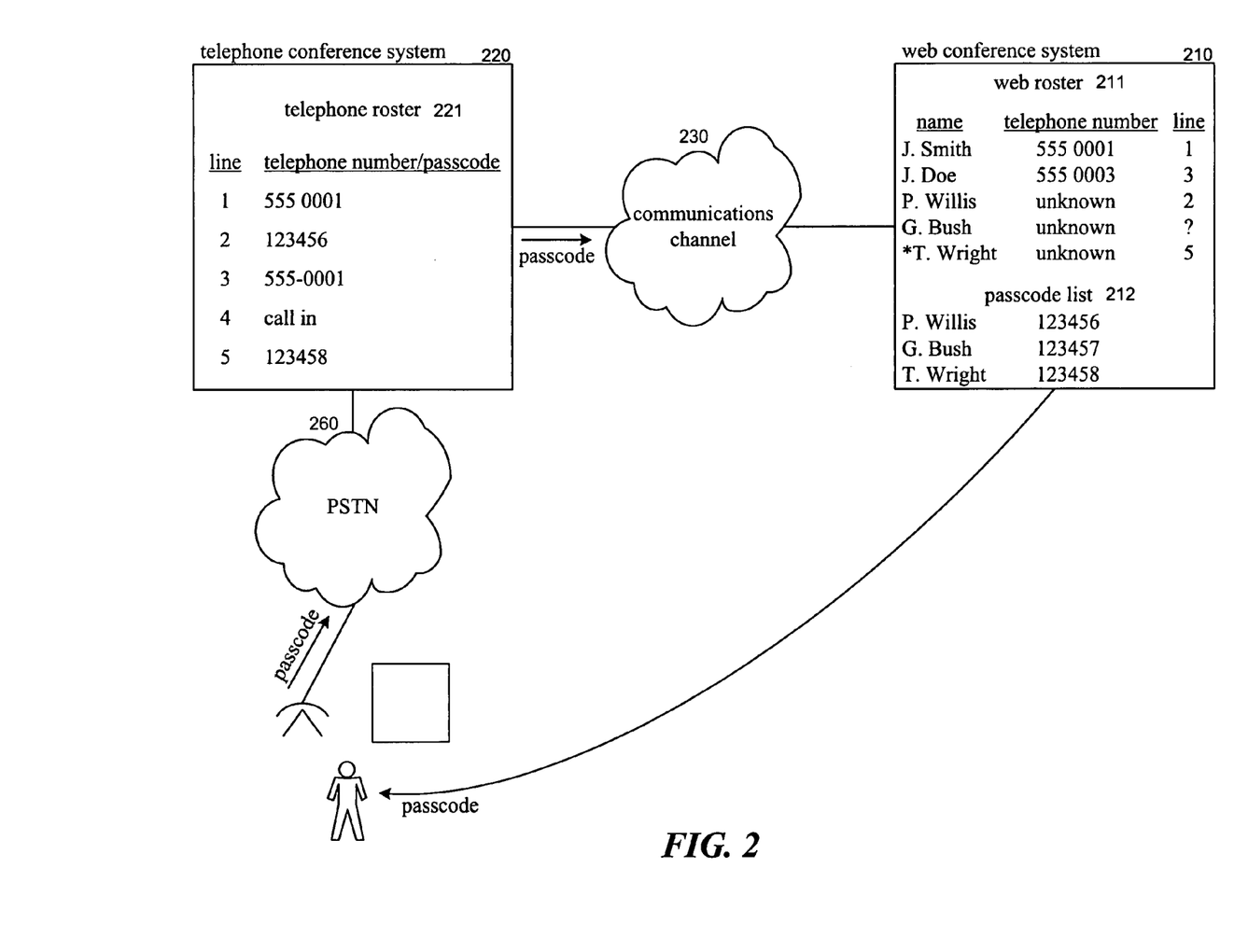
FIG. 2 is a block diagram that illustrates the identification of a telephone conference participant by the web conference system in one embodiment.

FIG. 2 is a block diagram that illustrates the identification of a telephone conference participant by the web conference system in one embodiment. The web conference system 210 maintains a web roster 211 that indicates the conference participants and maps those conference participants to their telephone lines. The web roster may also include an indication as to whether a conference participant is a telephone-conference-only participant, for example, as indicated by the asterisk next to T. Wright. To identify the telephone line that a telephone conference participant is using, the web conference system generates a pass code for each conference participant who has not been associated with a telephone line and stores it in a pass code list 212. The web conference system notifies a conference participant of their unique pass code. For example, if the conference participant has joined the web conference, then the web conference system may display a web page listing the pass code and directing the conference participant to enter the pass code via the telephone. Alternatively, the pass code may be provided in the invitation that is sent to the conference participant. Also, the web conference system may direct an announcement to be played to the conference participants directing each conference participant to identify themselves. For example, the announcement may direct T. Wright to select the 1 button of their phone and G. Bush to select the 2 button of their phone. When the pass code technique is used, the conference participant enters the pass code via their telephone. The telephone conference system then forwards the pass code along with an indication of the associated telephone line to the web conference system. The web conference system looks up the pass code in the pass code list to identify the conference participant to whom the pass code was assigned. The web conference system then updates the web roster for that conference participant to indicate the associated telephone line.

Figure 3:
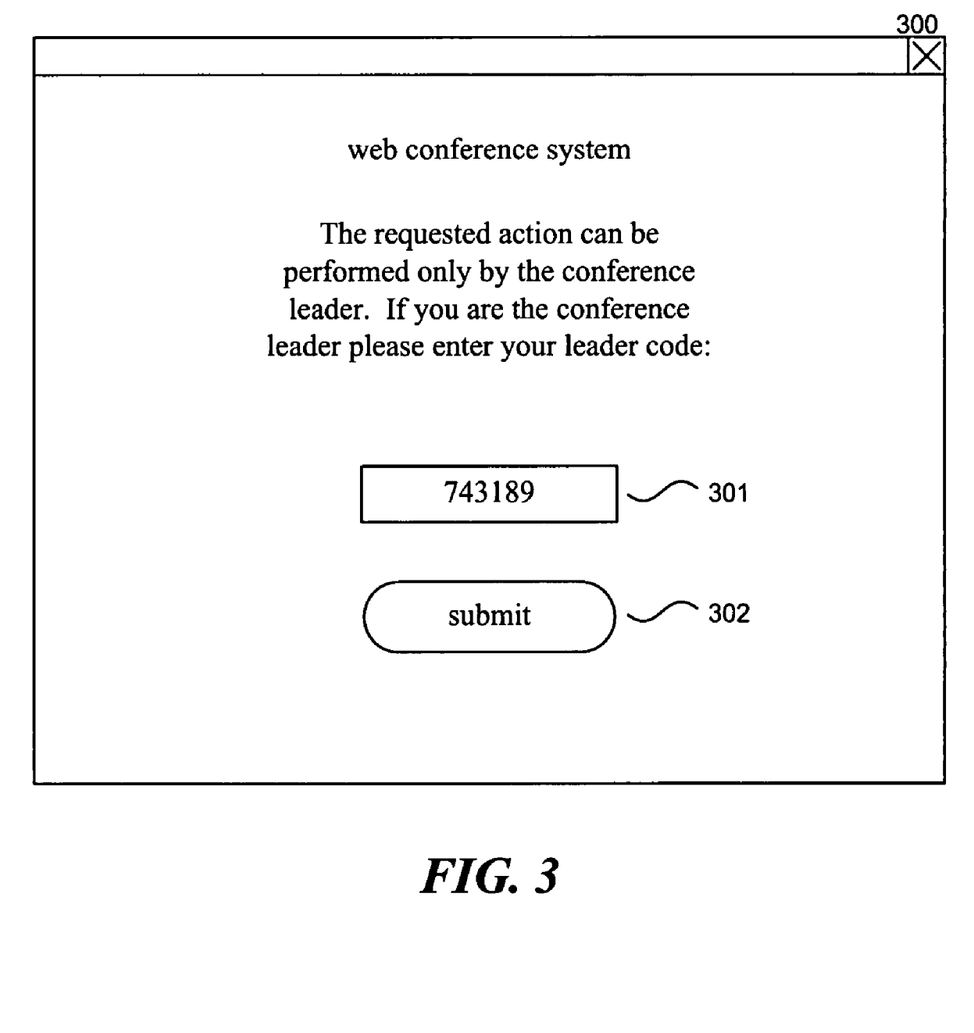
FIG. 3 is a display page that prompts a conference participant to identify themselves as the leader of the telephone conference in one embodiment.

FIG. 3 is a display page that prompts a conference participant to identify themselves as the leader of the telephone conference in one embodiment. The display page 300 is displayed by the web conference system when a conference participant attempts to execute a telephone conference command that can only be executed by the telephone conference leader. The display page requests the conference participant to enter the leader pass code of the telephone conference. When the conference participant enters a pass code in field 301 and selects the submit button 302, the web conference system validates whether the entered pass code corresponds to the leader pass code. If so, then the web conference system allows that conference participant to execute telephone conference commands that can only be executed by the telephone conference leader.

Figure 4:
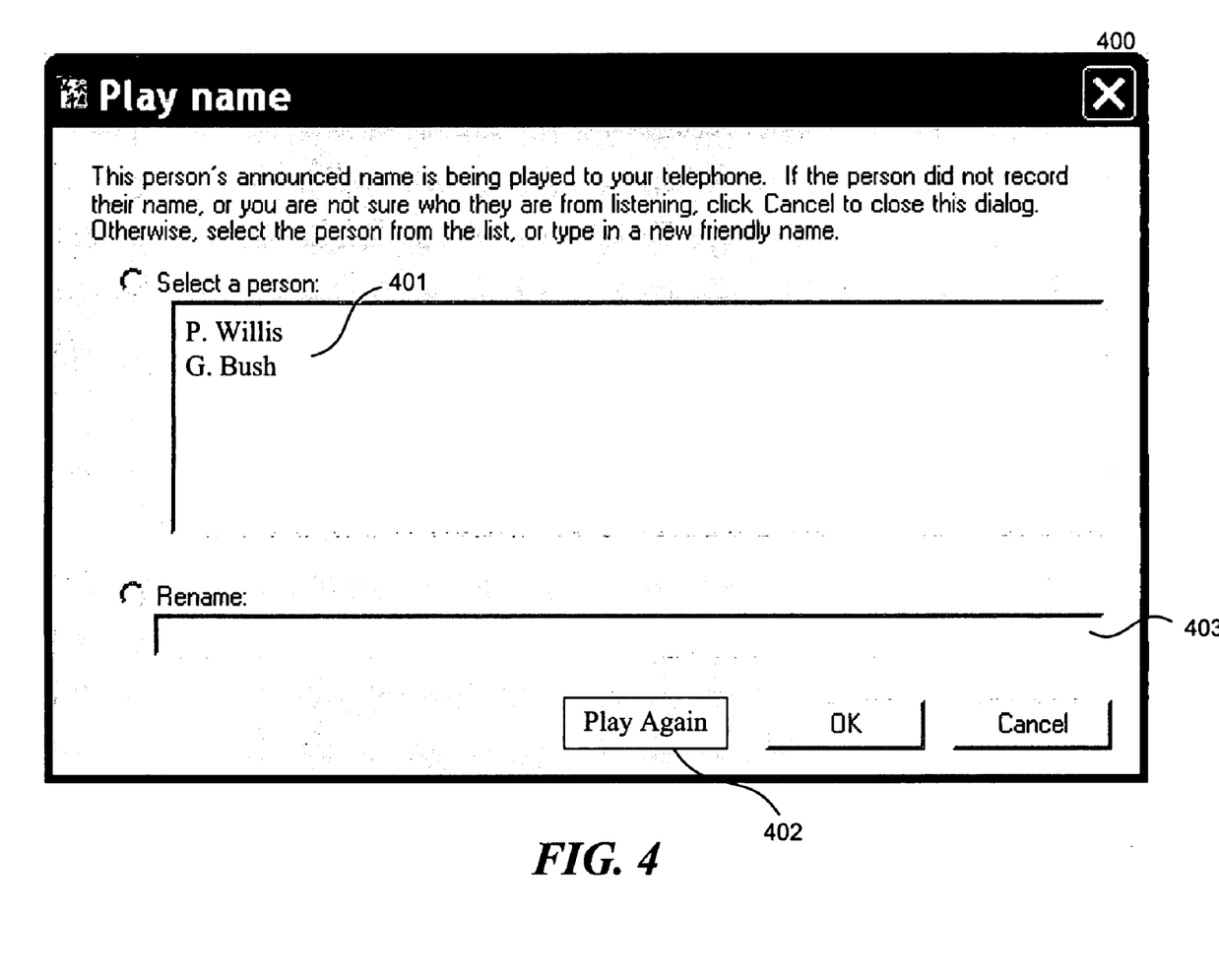
FIG. 4 is a display page that provides the names of the conference participants who have not been associated with a telephone line.

FIG. 4 is a display page that provides the names of the conference participants who have not been associated with a telephone line. The web conference system displays display page 400 so that the user to which it is displayed can identify the telephone lines associated with the conference participants. The web conference system also directs the telephone conference system to play the identification announcement associated with a telephone line to the user. When the user hears the identification announcement, the user can select the person associated with that identification announcement. The web conference system then associates the identified conference participant with the telephone line associated with the identification announcement. The display page includes a names area 401 and a play again button 402. The user can select the play again button to replay the last identification announcement. The display page may include an area 403 in which the user can enter the name of a conference participant (e.g., "caller 5" to J. Thomas) who is only participating in the telephone conference.

Figure 5:
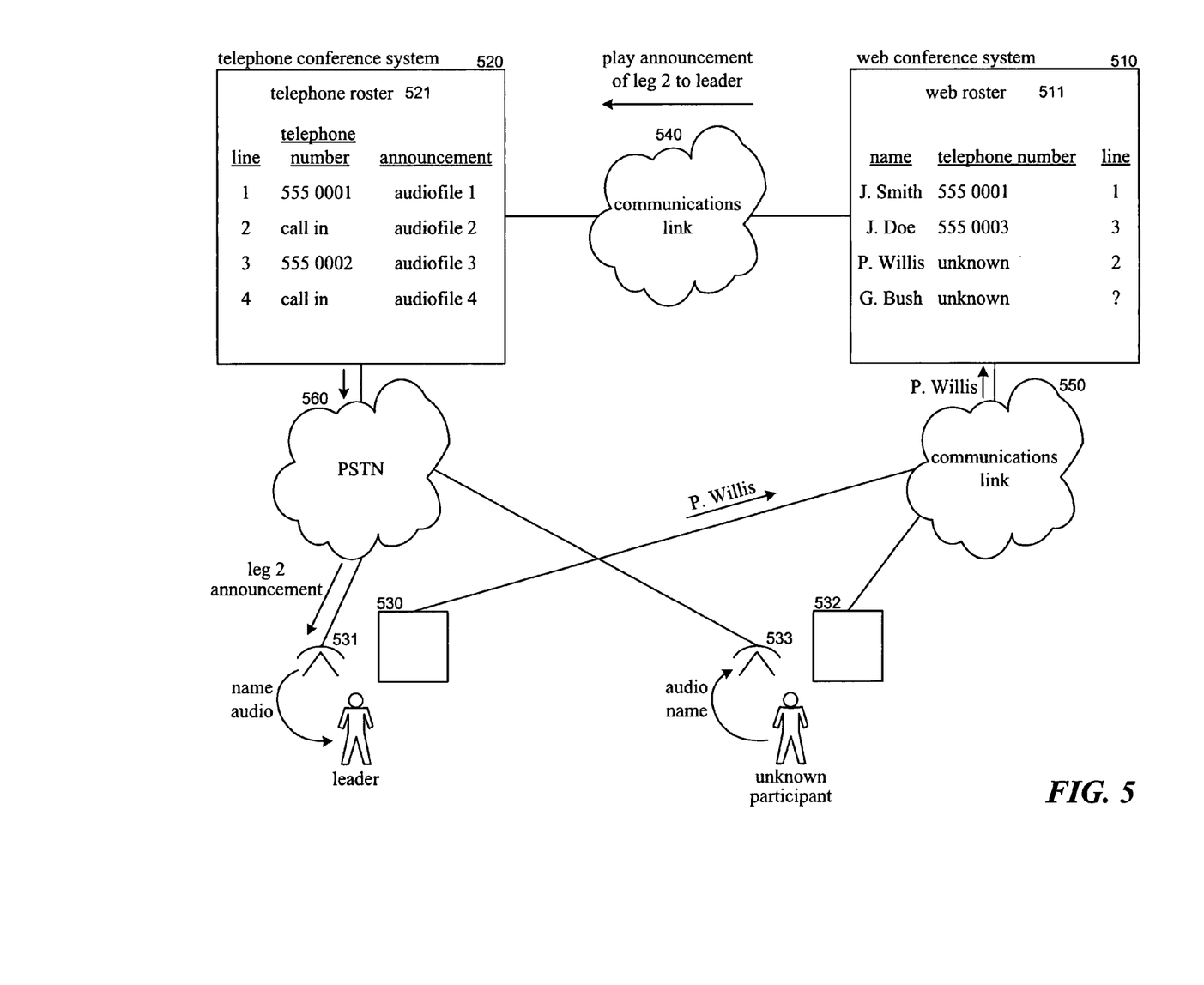
FIG. 5 is a block diagram that illustrates the identification of a conference participant by playing the identification announcement.

FIG. 5 is a block diagram that illustrates the identification of a conference participant by playing the identification announcement. A web conference system 510 maintains a web roster 511 that indicates conference participants and associated telephone lines. Each conference participant of the telephone conference provides an identification announcement to a telephone conference system 520 when joining the telephone conference. For example, the participant at computer system 532 using telephone 533 may state that their name is P. Willis as the identification announcement. To identify the telephone lines associated with the conference participants, the web conference system provides a web page, such as the display page of FIG. 4, to a computer 530 of the conference leader. The web conference system sends a message via a communications link 540 to the telephone conference system 520 directing it to play the identification announcement of a certain line to the conference leader. The telephone conference system then sends that identification announcement via a telephone network 560 to telephone 531 of the conference leader. When the conference leader hears and recognizes the name of the conference participant, the conference leader designates that conference participant on the display page of FIG. 4 which is sent to the web conference system via a communications link 550. The web conference system can then associate the identified conference participant with the telephone line. In one embodiment, the web conference system may direct the telephone conference system to provide the identification announcement directly to the web conference system (e.g., in an audio file). The web conference system can then use voice recognition technology to recognize which conference participant is identified by that identification announcement.

Figure 6:
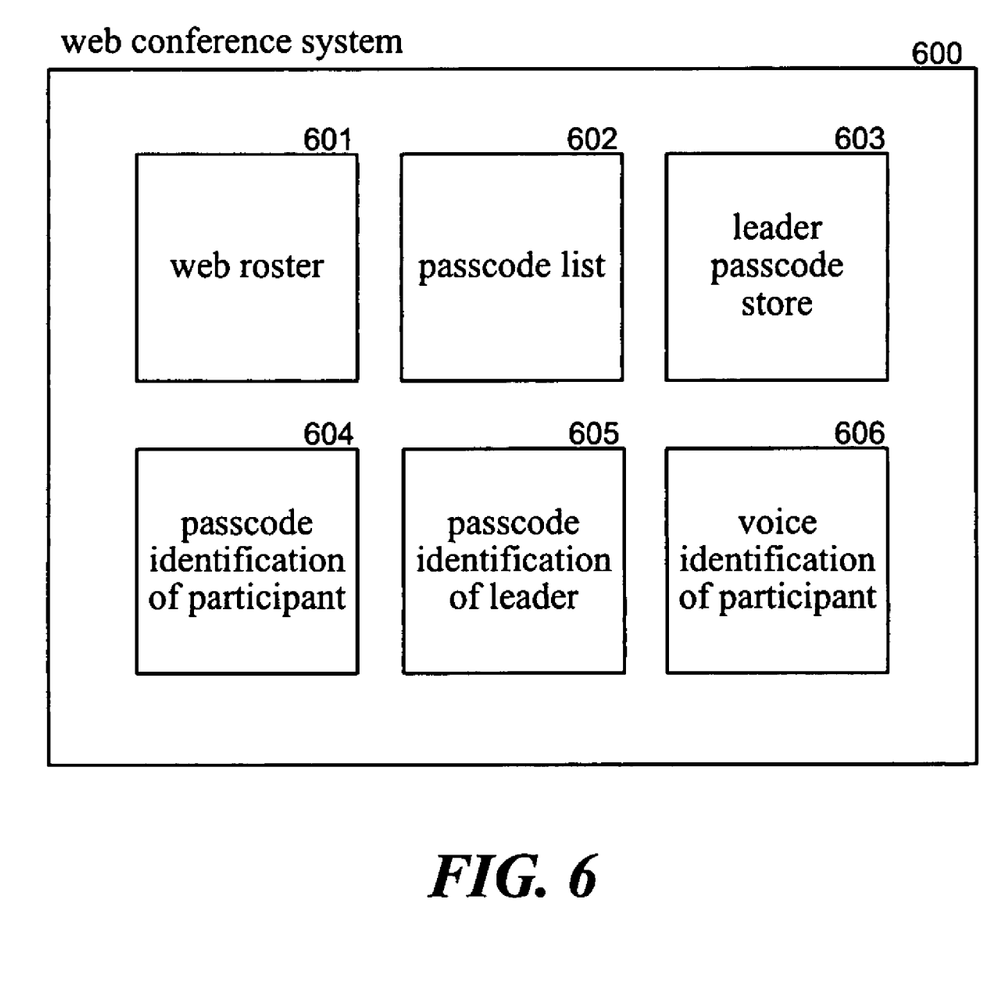
FIG. 6 is a block diagram that illustrates components of the web conference system in one embodiment.

FIG. 6 is a block diagram that illustrates components of the web conference system in one embodiment. The web conference system may include a web roster 601, a pass code list 602, and a leader pass code store 603. The web roster maps each conference participant to the associated telephone line. The pass code list contains the unique pass code that has been assigned to conference participants. The leader pass code store contains the pass code of the leader of the telephone conference. The web conference system also includes a pass code identification of participant component 604, a pass code identification of leader component 605, and a voice identification of participant component 606. The pass code identification of participant component identifies a participant via a unique pass code entered by that conference participant. The pass code identification of leader component identifies the leader of a telephone conference by the leader pass code entered by the conference participant. The voice identification of participant component identifies a participant by playing the identification announcement to a user.

The computing device on which the conference system is implemented may include a central processing unit, memory, input devices (e.g., keyboard and pointing devices), output devices (e.g., display devices), and storage devices (e.g., disk drives). The memory and storage devices are computer-readable media that may contain instructions that implement the conference system. In addition, the data structures and message structures may be stored or transmitted via a data transmission medium, such as a signal on a communications link. Various communications links may be used, such as the Internet, a local area network, a wide area network, a point-to-point dial-up connection, a cell phone network, and so on.

Embodiments of the conference system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The conference system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 7:
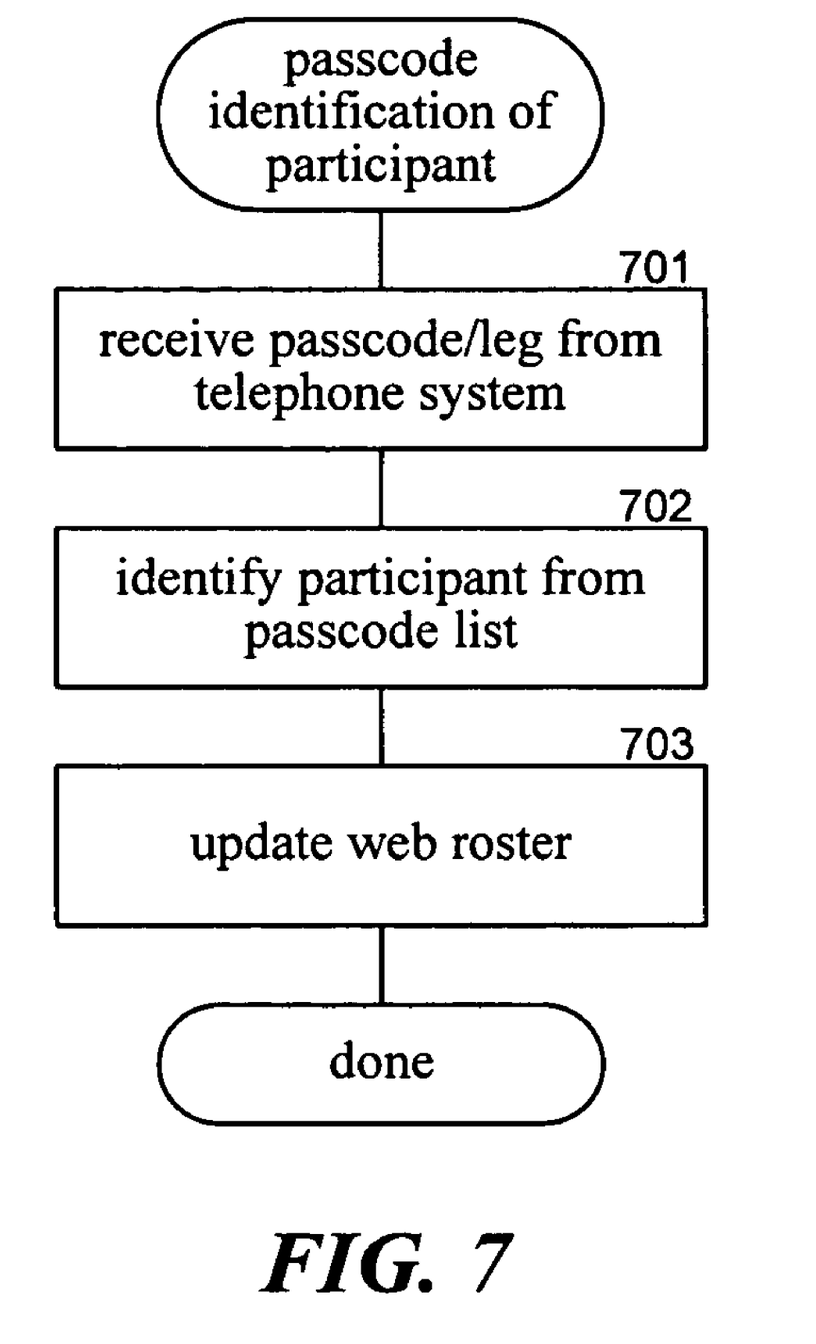
FIG. 7 is a flow diagram that illustrates the processing of a pass code identification of a participant component of the web conference system in one embodiment.

FIG. 7 is a flow diagram that illustrates the processing of the pass code identification of participant component of the web conference system in one embodiment. In block 701, the component receives the mapping of a pass code to a telephone line number from the telephone conference system. The component may have previously provided that pass code to a conference participant. In block 702, the component identifies the conference participant based on the pass code from the pass code list. In block 703, the component updates the web roster to associate the identified conference participant with the telephone line. The component then completes.

Figure 8:
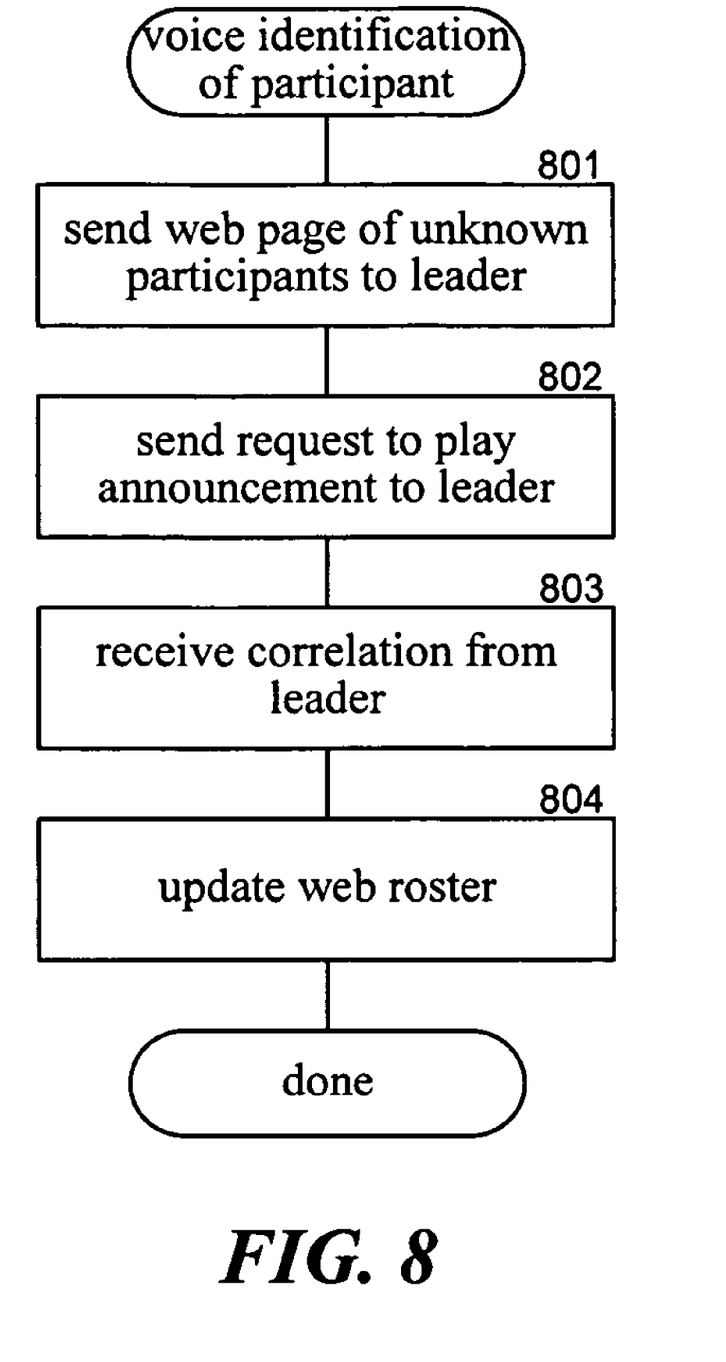
FIG. 8 is a flow diagram that illustrates the processing of a voice identification of participant component of the web conference system in one embodiment.

FIG. 8 is a flow diagram that illustrates the processing of the voice identification of participant component of the web conference system in one embodiment. In block 801, the component sends a web page listing conference participants not associated with a telephone line to the conference leader. In block 802, the component sends a request to the telephone conference system to play the identification announcement of a telephone line not associated with a conference participant to the conference leader. In block 803, the component receives an identification of a conference participant from the conference leader. In block 804, the component updates the roster to associate the identified conference participant with the telephone line associated with the identification announcement that was played to the conference leader. The component then completes.

From the foregoing, it will be appreciated that specific embodiments of the conference system have been described herein for purposes of illustration, but that various modifications may be made without deviating from the spirit and scope of the invention. Accordingly, the invention is not limited except as by the appended claims.

I claim:

1. A method in a conference system having a processor and memory for associating a conference participant with a telephone line,
   the method comprising:
      for each of a plurality of conference participants,
         receiving from the conference participant an incoming call on a telephone line;
         after the received incoming call is answered, receiving via the telephone line from the conference participant an audio name announcement;
         determining by the processor whether the conference participant can be automatically identified based on information provided with the incoming call;
         when the conference participant can be automatically identified based on information provided with the incoming call, associating in the memory with the telephone line an identification of the conference participant that was automatically identified;
         when the conference participant cannot be automatically identified based on information provided with the incoming call,
            providing to a user a display of conference participants who have not been associated with a telephone line;
            outputting to the user the audio name announcement received via the telephone line;
            receiving from the user an identification of the conference participant associated with the telephone line based on the user recognizing the name of the conference participant from the output audio name announcement; and
            associating in the memory with the telephone line the identification of the conference participant that was received from the user.

2. The method of claim 1 wherein the user is the leader of the conference.

3. The method of claim 1 wherein the audio name announcement is provided by a caller as an identification for other conference participants.

4. The method of claim 1 wherein the conference system is a web-based conference system.

5. The method of claim 1 wherein the user can request that the audio name announcement be repeated.

6. A computer-readable storage medium containing instructions capable of being executed by a computer for controlling a web conference system to associate conference participants with telephone calls of a telephone conference system for a conference having a web portion and a telephone portion, by a method comprising:
   receiving from the conference participants requests to join the web portion of the conference;
   establishing the telephone portion of the conference with telephone calls between the telephone conference system and the conference participants;
   providing a mapping of audio identification announcements associated with the telephone calls, the identification announcements being provided by conference participants;
   when it can be determined from a telephone number associated with the telephone call that the telephone call is associated with a conference participant, associating for the conference that telephone call with that conference participant; and
   when a conference participant is not associated with a telephone call,
      directing the telephone conference system to provide to a user the audio identification announcement associated with the telephone call of the telephone portion of the conference as indicated by the mapping;
      determining the conference participant who corresponds to the provided audio identification announcement by receiving from the user an identification of the conference participant identified by the audio identification announcement; and
      associating that telephone call with the determined conference participant so that when a conference participant speaks during the telephone conference, the web conference system can use the association between telephone calls and conference participants to identify the speaking conference participant.

7. The computer-readable storage medium of claim 6 wherein the user is provided with the identification of conference participants not associated with a telephone line.

8. The computer-readable storage medium of claim 6 wherein the user is the leader of the conference.

9. The computer-readable storage medium of claim 6 wherein the audio identification announcement is provided by a caller as an identification for other conference participants.

10. The computer-readable storage medium of claim 6 wherein a conference participant not associated with a telephone line is a person who joins the telephone conference by dialing in.

11. A computer-based conference system for associating a conference participant with a telephone line of a telephone conference system, comprising:
   a mapping of audio identification announcements associated with telephone lines of the telephone conference, the audio identification announcements being provided by conference participants;
   a component that for each telephone line of the telephone conference,
      when it is determined that non-audio identification information that uniquely identifies the conference participant who called in via that telephone line has been provided, associates that telephone line with that conference participant; and
      when it is determined that non-audio identification information that uniquely identifies the conference participant who called in via that telephone line has not been provided:
         directs a telephone conference system conducting a telephone conference in parallel with a computer-based conference to output to a user an audio identification announcement associated with a telephone line of a telephone conference as indicated by the mapping;

receives from the user an identification of the conference participant who corresponds to the output audio identification announcement; and associates that telephone line with the determined identification of the conference participant as indicated by the mapping wherein the components are implemented as computer-executable instructions stored in memory for execution by the computer of the conference system.

12. The computer-based conference system of claim 11 wherein the component that directs the telephone conference system to output the audio identification announcement plays the audio identification announcement to a user.

13. The computer-based conference system of claim 11 wherein the user is provided with the identification of conference participants not associated with a telephone line.

14. The computer-based conference system of claim 11 wherein the user is the leader of the conference.

15. The computer-based conference system of claim 11 wherein a conference participant not associated with a telephone line is a person who joins the telephone conference by dialing in.

* * * * *